United States Patent [19]

Hatfield

[11] Patent Number: 5,531,952
[45] Date of Patent: Jul. 2, 1996

[54] METHOD AND APPARATUS FOR FORMING TUBULAR PLASTIC FILM

[75] Inventor: Eric P. Hatfield, Montgomery, Ohio

[73] Assignee: James River Paper Company, Inc., Milford, Ohio

[21] Appl. No.: 364,606

[22] Filed: Dec. 27, 1994

[51] Int. Cl.⁶ .......................... B29C 47/06; B29C 47/20
[52] U.S. Cl. .................... 264/171.260; 264/514; 264/173.18; 264/209.8; 425/133.1; 425/192 R; 425/326.1; 425/380; 425/462; 425/467
[58] Field of Search .................... 264/514, 173, 264/209.8, 171.26–171.28, 173.18; 425/380, 462, 467, 326.1, 466, 381, 133.1, 192 R

[56] References Cited

U.S. PATENT DOCUMENTS

| | | | |
|---|---|---|---|
| 3,311,952 | 4/1967 | Kovach et al. | 425/467 |
| 3,649,143 | 3/1972 | Papesh et al. | |
| 3,694,292 | 9/1972 | Schippers et al. | |
| 3,957,566 | 5/1976 | Rahlfs. | |
| 3,966,377 | 6/1976 | Upmeier et al. | |
| 4,042,661 | 8/1977 | Cook. | |
| 4,063,865 | 12/1977 | Becker | 425/467 |
| 4,076,568 | 2/1978 | Kubat et al. | |
| 4,093,414 | 6/1978 | Swiatovy, Jr. | |
| 4,152,104 | 5/1979 | Przytulla et al. | |
| 4,167,383 | 9/1979 | Murakami et al. | |
| 4,208,178 | 6/1980 | Przytulla. | |
| 4,265,693 | 5/1981 | Nishimoto et al. | |
| 4,268,239 | 5/1981 | Herrington | 425/380 |
| 4,281,981 | 8/1981 | Feldman | 425/467 |
| 4,285,656 | 8/1981 | Herrington | 425/467 |
| 4,362,488 | 12/1982 | Casals et al. | |
| 4,738,611 | 4/1988 | Briggs | 425/467 |
| 4,832,589 | 5/1989 | Gini et al. | |
| 4,961,892 | 10/1990 | Prevotat | 425/467 |
| 5,143,677 | 9/1992 | Blemberg et al. | 425/462 |
| 5,262,109 | 11/1993 | Cook. | |

FOREIGN PATENT DOCUMENTS

| | | | |
|---|---|---|---|
| 2377878 | 9/1978 | France | 425/467 |
| 1140337 | 11/1962 | Germany | 425/380 |
| 2232774 | 1/1974 | Germany | 425/380 |
| 397358 | 1/1974 | U.S.S.R. | 425/380 |

Primary Examiner—Jeffery R. Thurlow
Attorney, Agent, or Firm—Wood, Herron & Evans

[57] ABSTRACT

Apparatus for producing a tubular plastic product, for example film, has a die body with inner and outer die members defining between them an annular space, and a first inlet for feeding a first stream of resin into the annular space. The inner and outer die members define an annular chamber communicating between the first inlet and the annular space. The resin stream from the first resin inlet divides into two substreams which flow in the annular chamber in opposite directions about the longitudinal axis of the annular space and then join. A second inlet downstream of the first inlet feeds a second stream of resin into the annular space and over the weld line of the annular resin stream. The annular resin stream is expressed through an annular orifice to form the tubular film. In another embodiment, a discrete relieved area is provided in one of the inner and outer die members downstream of the inlet and defines a mixing chamber in which the two resin substreams are mixed where they join to form the annular stream of resin so as to avoid forming a distinct weld line where the substreams join.

22 Claims, 2 Drawing Sheets

METHOD AND APPARATUS FOR FORMING TUBULAR PLASTIC FILM

FIELD OF THE INVENTION

This invention relates generally to the formation of plastic film, and more particularly to method and apparatus for forming tubular plastic film which strengthens the weld line in the film thereby strengthening the film.

BACKGROUND OF THE INVENTION

In the production of tubular plastic film, an extrusion die body is employed which has inner and outer die members defining between them an annular space having a longitudinal axis. The outer die member includes an inlet for feeding a stream of resin into the annular space. The inner and outer die members further define an annular chamber which communicates between the inlet and the annular space. A resin stream is supplied from the inlet and divides into two substreams which flow in the annular chamber in opposite directions about the annular space longitudinal axis. These two resin substreams join on the side of the die body opposite the inlet within the annular space to form an annular stream of resin which progresses through the annular space and is finally expressed through an annular orifice of the die body to form the tubular film. The tubular film may be inflated with air to form blown film.

In the area at which the two resin substreams join to form the annular stream of resin, a distinct, so-called "weld line" is formed. This resulting weld line is a source of weakness in the finished film product. Prior efforts aimed at strengthening the weld line or eliminating it as a source of weakness have either not met with complete success or have required rather complicated, and hence expensive, die designs.

It is therefore an objective of the present invention to provide improved method and apparatus for forming tubular film which strengthens the weld line in tubular film.

SUMMARY OF THE INVENTION

In accordance with the stated objective, the present invention provides apparatus for producing a tubular plastic product, for example tubular plastic film. The apparatus comprises a die body having inner and outer die members defining between them an annular space which has a longitudinal axis. A first inlet is provided for feeding a first stream of resin into the annular space. The inner and outer die members further define an annular chamber communicating between the first inlet and the annular space. The first resin stream divides into two substreams which flow in the annular chamber in opposite directions about the annular space longitudinal axis and then join, defining a weld line, to form an annular stream of resin. A second inlet is provided downstream of the first inlet for feeding a second stream of resin into the annular space over the weld line of the annular resin stream. The second inlet places a discrete longitudinal patch over the weld line to reinforce the weld line. The die body has an annular orifice through which the annular resin stream is expressed to form the tubular film. The resulting tubular film is thus strengthened in the area of the weld line via the longitudinal patch.

In another embodiment of the present invention, a discrete relieved area is provided in either the inner or outer die member, or both, downstream of the first resin inlet, and is substituted in place of the second resin patch feeding inlet. The discrete relieved area defines a mixing chamber in the annular space in which the two resin substreams are mixed where the substreams join to form an annular stream of resin. The mixing of the two resin substreams avoids forming a distinct weld line where the substreams join thus strengthening the tubular film in the area where the two resin substreams join.

In yet another embodiment of the present invention, both the second resin inlet and the discrete relieved area are provided in the tubular plastic film producing apparatus. The second inlet downstream of the first inlet feeds the second stream of resin over the annular resin stream in the area where the two resin substreams join, while the discrete relieved area serves as a mixing chamber in which the two resin substreams are mixed. Therefore in this embodiment the tubular film benefits both from mixing of the substreams plus the addition of the longitudinal patch.

In a preferred form of the present invention, the first and second inlets are provided in the outer die member, as is the discrete relieved area. Further preferably, the discrete relieved area is formed as a part of an insert which is removably securable to the outer die member. The specific geometry of the mixing chamber may thus readily be changed by removably securing to the outer die member various ones of the inserts having varying relieved area geometries. In the embodiment which employs both the second resin inlet for providing a patch and the discrete relieved area providing a mixing chamber, the second inlet is preferably formed as a part of the insert which includes the geometry associated with the discrete relieved area defining the mixing chamber.

The present invention also provides methods of producing tubular plastic product, for example tubular plastic film, which include feeding a second stream of resin into the annular space and over the weld line of the annular resin stream so as to place a discrete longitudinal patch over the weld line to reinforce the weld line; feeding the two resin substreams into a discrete relieved area defining a mixing chamber, in the annular space, in which the two resin substreams are mixed where the substreams join to form an annular stream of resin so as to avoid forming a distinct weld line where the substreams join; and both feeding a second stream of resin over the annular resin stream and feeding the substreams into a discrete relieved area defining a mixing chamber.

A major advantage of the present invention is that the weld line or the area where the two resin substreams join to form an annular resin stream is strengthened thus strengthening the resulting film.

These and other objects and advantages of the present invention will become more readily apparent during the following the detailed description taken in conjunction with the drawings herein, in which:

DETAILED DESCRIPTION OF THE INVENTION

Figure 1:
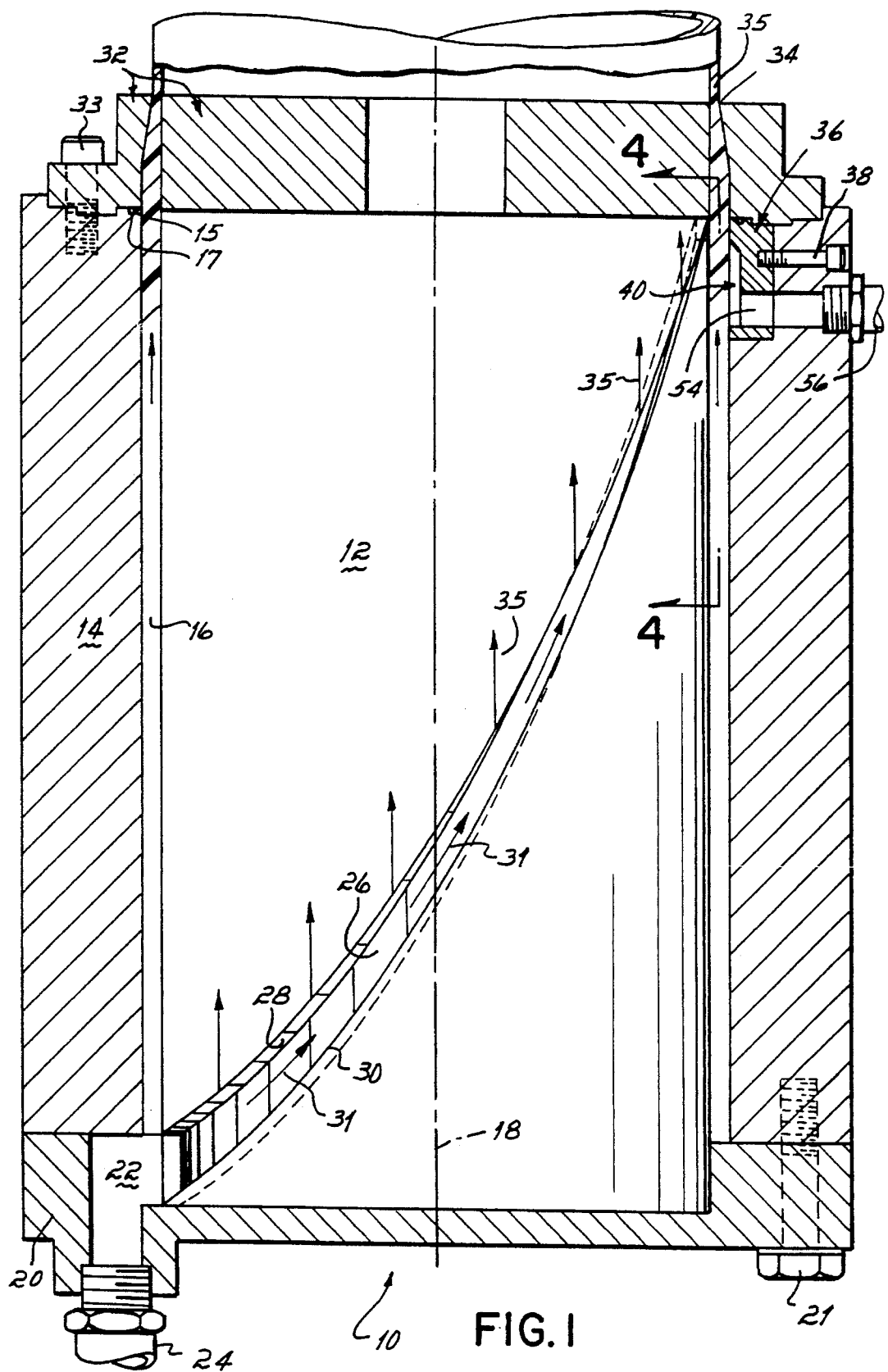
FIG. 1 is a sectional side view of apparatus for forming tubular plastic film including the principles of the present invention.

Referring first to FIG. 1, there is illustrated a die body 10 according to the principles of the present invention. The die body 10 includes an inner die member 12 and an outer die member 14. The inner and outer die members 12 and 14 define an annular space 16 therebetween which has a longitudinal axis 18. An adaptor 20 is secured to the lower end of the die body 10 by way of bolts one of which is shown at 21 and includes an inlet 22 to which is supplied resin from a resin source 24.

Inner die member 12 includes a circumferential groove or annular chamber 26 therein having upper and lower edges 28 and 30, respectively. Circumferential groove 26 in inner die member 12, in combination with the outer die member 14, define an annular chamber communicating between inlet 22 and annular space 16. Inner die member 12 including the annular chamber defined by groove 26 is generally of the form that is shown in U.S. Pat. No. 5,262,109, entitled "METHOD AND APPARATUS FOR FORMING MULTI-LAMINATE FILM", assigned to the assignee of the present invention, the entire substance of which is hereby incorporated by reference herein as if fully set forth in its entirety. Die body 10 further includes a die head 32 secured to the top of inner and outer die members 12 and 14, respectively by way of bolts one of which is shown at 33. Die member 14 includes an O-ring groove 15 with O-ring 17 disposed therein for effecting a seal between die head 32 and die member 14. Die head 32 includes an annular orifice 34 through which the annular resin stream is expressed to form the tubular film.

Resin entering the annular chamber defined by groove 26 from the inlet 22 divides into two substreams 31, 31 which flow in the annular chamber 26 in opposite directions about the annular space longitudinal axis 18. The two substreams join on the side of the die body opposite inlet 22 to form an annular stream of resin 35.

Figure 2:
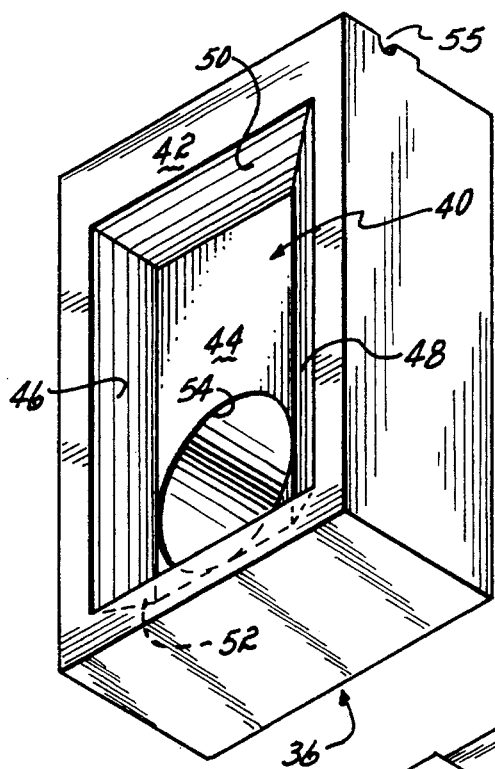
FIG. 2 is a perspective view of an insert according to the principles of the present invention which includes both a resin patch feed inlet as well as a relieved area defining a mixing chamber.

Referring now to FIGS. 1 and 2, outer die member 14 includes an insert 36 removably secured thereto by way of a threaded bolt 38. Insert 36 includes a discrete relieved area or cavity 40 therein. The discrete relieved area 40 at surface 42 is approximately 2.260" high by 1.520" wide. At surface 44, relieved area 40 is approximately 2.000" high by 1.000" wide. Sidewalls 46 and 48 and one of the endwalls 50 each form an angle of approximately 30° with respect to surface 42, whereas the other endwall 52 is approximately perpendicular to surface 42. At the lower or bottom end of surface 44 there is a feed inlet 54 which is approximately 1" in diameter and is for feeding a second stream of resin supplied from another or second source 56 into the annular space 16. Feed inlet 54 is positioned relative to the annular chamber 26 so that the inlet 54 feeds a second stream of resin into the annular space 16 and over the annular resin stream in the area where the two resin substreams join thereby placing a discrete longitudinal patch over the annular resin stream to reinforce the stream. In addition, the discrete relieved area 40 defines a mixing chamber, in the annular space 16, in which the two resin substreams are mixed where the substreams join to form the annular stream of resin so as to avoid forming a distinct weld line where the substreams join. The insert 36 includes an O-ring groove 55 in its top surface for accepting the O-ring 17.

It will be appreciated that the insert of FIGS. 1 and 2 can be used with or without a supply of resin from the second resin source 56. Should no discrete longitudinal patch be placed over the annular resin stream by the second resin inlet 54, the two resin substreams still have the benefit of mixing in the discrete relieved area 40 thereby avoiding forming a distinct weld line where the substreams join and thus strengthening the resulting tubular film. Alternatively, only the second resin inlet 54 could be utilized, without the discrete relieved area 40. In that case a distinct weld line forms where the two resin substreams join. The annular resin stream is strengthened in the area of the weld line by the discrete longitudinal patch being placed over the weld line by the second resin inlet 54.

Figure 3:
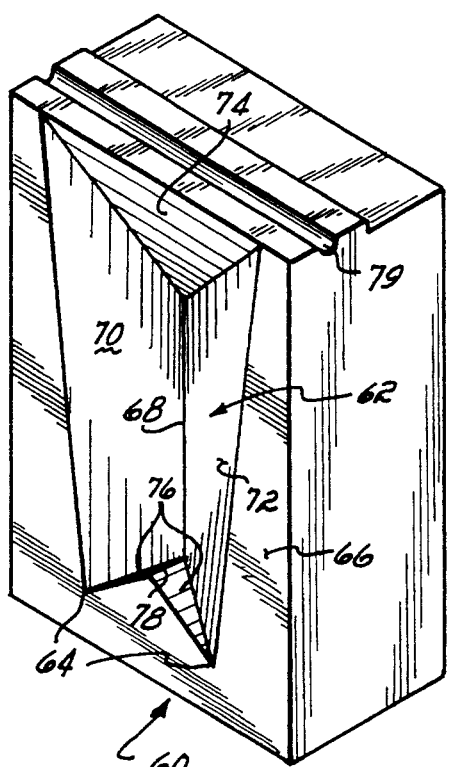
FIG. 3 is a perspective view of another insert employing the principles of the present invention which includes a different relieved area geometry.

Referring to FIG. 3, there is another form of insert illustrated at 60. In this form of insert, no resin patch feed inlet is incorporated therein. Rather, the insert 60 includes only a relieved area 62 which, as described above, serves as a mixing chamber for mixing the two lateral substreams of resin thereby avoiding a distinct weld line. The relieved area 62 is approximately 1.498" across at the top, and is approximately 2.625" in height measured down to lower most points 64, 64 at surface 66. Trough 68 is approximately 0.200" deep as measured from surface 66. Endwall 74 is oriented approximately 15° with respect to surface 66. Endwalls 76, 76 are generally perpendicular with respect to surface 66, and apex 78 is located approximately 0.609" above corners 64, 64. At the upper end of the insert 60, each side wall 70 and 72 forms an angle of approximately 15° relative to surface 66, whereas at the lower end of the insert 60, the walls 70 and 72 each form an angle of approximately 25° relative to surface 66. An O-ring groove 79 is included in the top surface of insert 60.

Figure 3A:
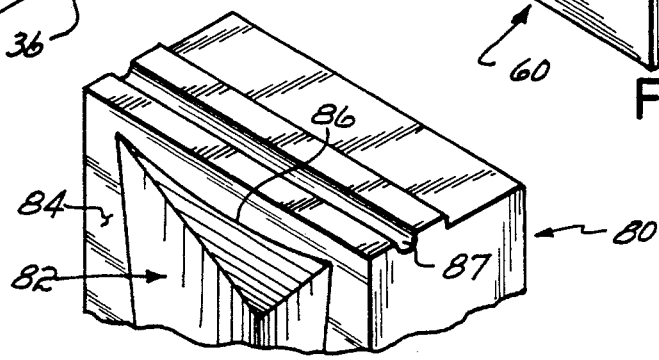
FIG. 3A is a perspective view of yet another insert employing the principles of the present invention which includes yet another relieved area geometry.

Referring now to FIG. 3A, there is yet another form of insert illustrated at 80. This form of insert is generally similar to that illustrated in FIG. 3, except that its relieved area 82 does not extend all the way to the top edge of the insert as does the relieved area 62 of the insert 60. In this connection, surface 84 extends around all four sides of the relieved area 82, as opposed to only three sides (left, right and bottom sides) of the insert 60. The top edge 86 of the relieved area 82 is generally arcuately shaped, being convex in curvature towards the lower end of the insert 80. Like the prior inserts, an O-ring groove 87 is included in the top of the insert 80.

It will therefore be appreciated that the specific geometry may thus readily be changed or varied by removably securing to the outer die member various ones of the inserts having varying relieved area geometries. Therefore, the geometry may be quickly modified should different resins which require different mixing chamber geometries be employed to fabricate tubular film in the die.

Figure 4:
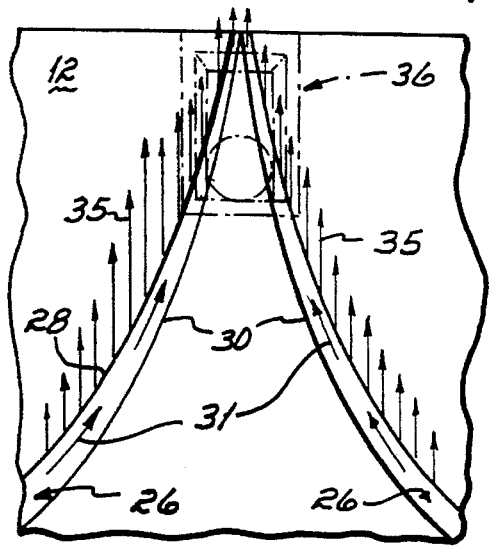
FIG. 4 is a view taken along line 4—4 of FIG. 1 showing the two lateral flowing resin substreams traveling toward the insert of FIG. 2 and the resulting annular resin stream.
Figure 5:
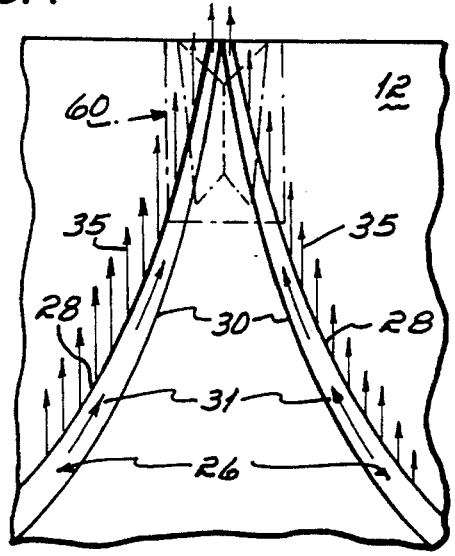
FIG. 5 is a view similar to FIG. 4 but with the insert of FIG. 3 shown.

In FIGS. 4 and 5, inserts 36 and 60, respectively, are shown in relation to the laterally flowing substreams 31, 31 of resin which flow in groove 26 in inner die member 12, and the resulting annular stream of resin 35 flowing in annular space 16. As seen in FIGS. 4 and 5, laterally flowing resin substreams 31, 31 flow around inner die member 12 in groove 26 converging upon the insert 36 (or 60). Once the resin substreams 31, 31 reach the relieved area 40 of insert 36, or relieved area 62 of insert 60, the resin substreams leave the groove 26 in die member 12 and fill the relieved area 40 or 60. During filling of this relieved area or cavity, the two substreams 31, 31 become more completely mixed than if no mixing chamber in the form of an insert with relief area was utilized. Once the cavity or relieved area of the insert 36 or 60 becomes filled with resin from the lateral substreams 31, 31, the resin is then forced upwardly out of the relieved area 40 or 62 and into the annular space 16.

Those skilled in the art will readily recognize numerous adaptations and modifications which can be made to the method and apparatus for forming tubular plastic film of the present invention, yet all of which will fall within the spirit and scope of the present invention as defined by the following claims. For example, the principles of the present invention could readily be employed in a die of the type which produces multilaminate tubular film. The longitudinal patch can be applied to the annular resin stream on the outside, the inside or both. The relieved area can be provided in the outer die member, the inner die member or both. In addition, while three specific geometrical configurations of relieved areas or mixing chambers have been disclosed which have been found to provide suitable mixing of the lateral resin substreams so as to avoid a distinct weld line in the annular film, other geometries may work equally as well to provide such mixing. Further, the principles of the present invention may be employed in a die of the type which produces pipe or tubing as well as in a die which produces film. Accordingly, the invention is to be limited only by the scope of the following claims and their equivalents.

What is claimed is:

1. Apparatus for producing a tubular plastic product comprising:

a die body having inner and outer die members and defining therebetween an annular space having a longitudinal axis;

a first inlet for feeding a first stream of resin into said annular space;

said inner and outer die members further defining an annular chamber communicating between said first inlet and said annular space such that the first resin stream flows from said annular space into said annular chamber and divides into two substreams as the resin flows against said inner die member, the substreams flowing laterally in opposite directions around said inner die member and converging on the side of said die body opposite said first inlet to form an annular stream of resin having a weld line where the two substreams join;

a second inlet downstream of said first inlet for feeding a second stream of resin into said annular space, said second inlet being disposed where the two substreams converge to form the weld line so that the second stream of resin is fed over the weld line of the annular resin stream so as to place a discrete longitudinal patch over the weld line to reinforce the weld line;

said die body further having an annular orifice through which the annular resin stream is expressed to form the tubular product.

2. The apparatus of claim 1 wherein said first and second inlets are in said outer die member.

3. The apparatus of claim 1 wherein the tubular plastic product is tubular plastic film.

4. Apparatus for producing a tubular plastic product comprising:

a die body having inner and outer die members defining therebetween an annular space having a longitudinal axis;

an inlet for feeding a stream of resin into said annular space;

said inner and outer die members further defining an annular chamber communicating between said first inlet and said annular space such that the first resin stream flows from said annular space into said annular chamber and divides into two substreams as the resin flows against said inner die member, the substreams flowing laterally in opposite directions around said inner die member and converging on the side of said die body opposite said first inlet to form an annular stream of resin having a weld line where the two substreams join;

a discrete relieved area in one of said inner and outer die members downstream of said inlet defining a mixing chamber in said annular space, said relieved area being disposed where the two substreams converge to form the weld line so the two resin substreams are allowed to mix where the substreams join to form an annular stream of resin so as to avoid forming a distinct weld line where the substreams join;

said die body further having an annular orifice through which the annular stream is expressed to form the tubular product.

5. The apparatus of claim 4 wherein said inlet is in said outer die member.

6. The apparatus of claim 4 wherein said discrete relieved area is formed in said outer die member.

7. The apparatus of claim 6 wherein said discrete relieved area is formed as part of an insert which is removably securable to said outer die member, whereupon the specific geometry of said mixing chamber may be readily changed by removably securing to said outer die member various ones of said inserts having varying relieved area geometries associated therewith.

8. The apparatus of claim 4 wherein the tubular plastic product is tubular plastic film.

9. The apparatus of claim 4 wherein said discrete relieved area further includes a second inlet for feeding a second stream of resin into said annular space and over the annular resin stream in the area where the two resin substreams join so as to place a discrete longitudinal patch over the annular resin stream.

10. Apparatus for producing a tubular plastic product comprising:

a die body having inner and outer die members and defining therebetween an annular space having a longitudinal axis;

a first inlet for feeding a first stream of resin into said annular space;

said inner and outer die members further defining an annular chamber communicating between said first inlet and said annular space such that the first resin stream flows from said annular space into said annular chamber and divides into two substreams as the resin flows against said inner die member, the substreams flowing laterally in opposite directions around said inner die member and converging on the side of said die body opposite said first inlet to form an annular stream of resin having a weld line where the two substreams join;

a second inlet downstream of said first inlet for feeding a second stream of resin into said annular space; said second inlet being disposed where the two substreams converge to form the weld line so that the second stream of resin is fed over the annular resin stream so as to place a discrete longitudinal patch over the annular resin stream;

a discrete relieved area in one of said inner and outer die members downstream of said first inlet defining a mixing chamber in said annular space, said relieved area being disposed where the two substreams converge to form the weld line so the two resin substreams are allowed to mix where the substreams join to form an annular stream of resin so as to avoid forming a distinct weld line where the substreams join;

said die body further having an annular orifice through which the annular stream is expressed to form the tubular product.

11. The apparatus of claim 10 wherein said first and second inlets are in said outer die member.

12. The apparatus of claim 10 wherein said discrete relieved area is formed in said outer die member.

13. The apparatus of claim 12 wherein said discrete relieved area is formed as part of an insert which is removably securable to said outer die member, whereupon the specific geometry of said mixing chamber may be readily changed by removably securing to said outer die member various ones of said inserts having varying relieved area geometries associated therewith.

14. The apparatus of claim 13 wherein said second inlet is formed as a part of said insert.

15. The apparatus of claim 10 wherein the tubular plastic product is tubular plastic film.

16. A method of producing a tubular plastic product comprising the steps of:

feeding a first stream of resin into an annular space;

dividing the first resin stream into two substreams which flow laterally in opposite directions around the annular space and then converge to form an annular stream of resin having a weld line where the two substreams join;

feeding a second stream of resin into the annular space where the two substeams converge to form the weld line so that the second stream of resin is fed over the weld line of the annular resin stream so as to place a discrete longitudinal patch over the weld line to reinforce the weld line; and expressing the annular resin stream through an annular orifice to form the tubular product.

17. The method of claim 16 wherein the tubular plastic product is tubular plastic film.

18. A method of producing a tubular plastic product comprising the steps of:

feeding a stream of resin into an annular space;

dividing the resin stream into two substreams which flow laterally in opposite directions around the annular space and then converge to form an annular stream of resin having a weld line where the two substreams join;

feeding the substreams into a discrete relieved area defining a mixing chamber in the annular space, the relieved area being disposed where the two substreams converge to from the weld line so the two resin substreams are allowed to mix where the substreams join to form an annular stream of resin so as to avoid forming a distinct weld line where the substreams join; and expressing the annular resin stream through an annular orifice to form the tubular product.

19. The method of claim 18 wherein the tubular plastic product is tubular plastic film.

20. The method of claim 18 further comprising the step of feeding a second stream of resin from the discrete relieved area into the annular space and over the annular resin stream in the area where the two resin substreams join so as to place a discrete longitudinal patch over the annular resin stream.

21. A method of producing a tubular plastic product comprising the steps of:

feeding a first stream of resin into an annular space;

dividing the first resin stream into two substreams which flow laterally in opposite directions around the annular space and then converge to form an annular stream of resin having a weld line where the two substreams join;

feeding a second stream of resin into the annular space where the two substreams converge to form the weld line so that the second stream of resin is fed over the weld line of the annular resin stream so as to place a discrete longitudinal patch over the weld line to reinforce the weld line; and feeding the substreams into a discrete relieved area defining a mixing chamber in the annular space, the relieved area being disposed where the two substreams converge to from a weld line so the two resin substreams are allowed to mix where the substreams join to form an annular stream of resin so as to avoid forming a distinct weld line where the substreams join; and expressing the annular resin stream through an annular orifice to form the tubular product.

22. The method of claim 21 wherein the tubular plastic product is tubular plastic film.

* * * * *

UNITED STATES PATENT AND TRADEMARK OFFICE
CERTIFICATE OF CORRECTION

PATENT NO. : 5,531,952
DATED : July 2, 1996
INVENTOR(S) : Eric P. Hatfield

It is certified that error appears in the above-indentified patent and that said Letters Patent is hereby corrected as shown below:

Column 8, line 9, "from" should be -- form --.

Column 8, line 39, "from" should be -- form --.

Signed and Sealed this

Twenty-eighth Day of January, 1997

Attest:

BRUCE LEHMAN

Attesting Officer     Commissioner of Patents and Trademarks